Feb. 27, 1923.
L. J. QUAY
1,446,660
MOTOR VEHICLE
Filed July 29, 1921
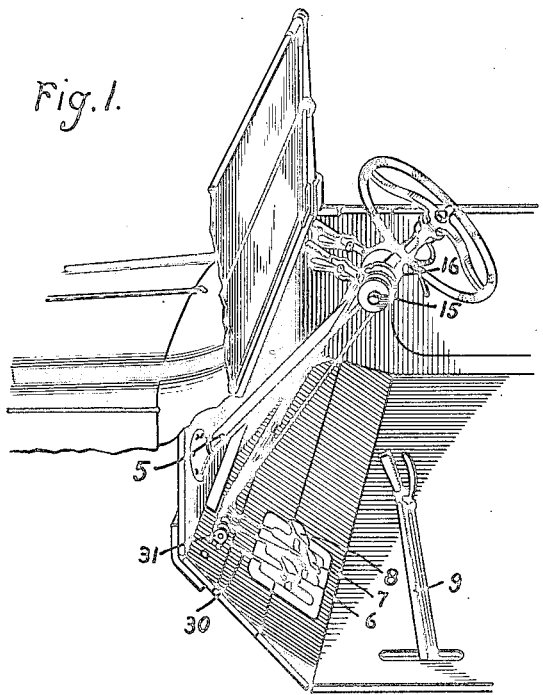
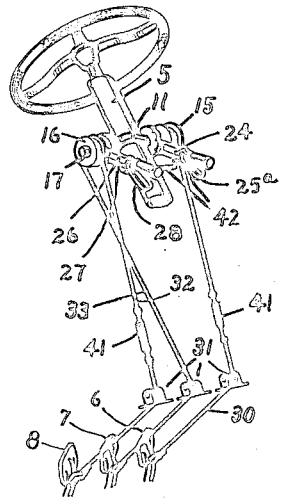
Inventor:
Lewis J. Quay,
by Alfred E. Boba
His Attorney Patented Feb. 27, 1923.

1,446,660

UNITED STATES PATENT OFFICE.

LEWIS J. QUAY, OF SCHENECTADY, NEW YORK.

MOTOR VEHICLE.

Application filed July 29, 1921. Serial No. 488,363.

*To all whom it may concern:*

Be it known that I, LEWIS J. QUAY, a citizen of the United States, residing at Schenectady, in the county of Schenectady, State of New York, have invented certain new and useful Improvements in Motor Vehicles, of which the following is a specification.

This invention relates to motor vehicles provided with planetary type transmissions and has for its object to provide an improved structure and arrangement which will enable a person who is unable to use one or both of his or her feet to operate the foot pedals of such a car with the hands.

The invention relates more particularly to an improved arrangement to enable such a person to operate a Ford automobile, and the invention is illustrated and described as applied to a Ford automobile although it is not necessarily limited thereto.

For a consideration of what I believe to be novel and my invention, attention is directed to the following specification and the claims appended thereto.

In the drawing Fig. 1 is a perspective view showing my invention applied to a Ford car; Fig. 2 is a perspective view looking at the foot pedals and steering post from the front; and Figs. 3 and 4 are perspective views of details.

Referring to the drawing, 5 indicates the steering post of the automobile, 6 the clutch pedal, 7 the reversing pedal, 8 the brake pedal, and 9 the emergency brake lever. As is well known in connection with the operation of a Ford automobile after the engine is started to put the automobile in motion, pedal 6 is first pushed part way down to neutral position after which lever 9 is pushed forward to release the brake. Pedal 6 is then pushed entirely down to throw the automobile into "low". After the automobile is started, pedal 6 is released so it may return to up position which puts the automobile into "high". When running in "high" the clutch can be thrown out by pushing pedal 6 part way down to neutral position, or the automobile can be put in "low" by pushing pedal 6 entirely down. The service brake is applied by pushing pedal 8 down. To reverse the automobile, pedal 6 is pushed down to neutral position after which reversing pedal 7 is pushed down causing the car to move backwards, i. e. putting it in "reverse". When lever 9 is pulled back the clutch is thrown out and the emergency brake applied.

According to my invention, I provide a yoke 10 which is clamped to steering post 5 by a strap 11 and suitable fastening members 12, the arrangement being such that the yoke can be readily applied to and removed from the post whenever desired. The two ends of yoke 10 terminate in stub shafts 13 and 14 on which are loosely mounted drums 15 and 16 held in place by nuts 17. Fixed to yoke 10 are two disks 18 and 19. Disk 18 has three notches 20, 21 and 22, which may be termed "high", "neutral" and "low" notches, corresponding to the three positions of pedal 6. Disk 19 has preferably only a single notch 23, which corresponds to released positions of the service pedal 8 and reversing pedal 7. Fixed to drum 15 is an operating lever 24 which carries a spring pressed latch 25 adapted to engage notches 20, 21 and 22, a lever 25ª being provided for releasing the latch in the usual manner. Fixed to drum 16 is an operating lever 26 having a latch 27 adapted to engage notch 23, a lever 28 being provided for releasing the latch.

Connected to clutch pedal 6 is one end of a cable 30, the other end being connected to drum 15. A series of three pulleys 31 are fastened to the floor board back of the foot pedals and cable 30 passes first forward around one of these pulleys and thence up over the top of drum 15 so that an upward movement of lever 24 will wind the cable around the drum and pull pedal 6 down. The arrangement is such that when latch 26 is in notch 20 pedal 6 is in normal released position which is "high" when the car is running; when in notch 21 pedal 6 is in "neutral", and when in notch 22 pedal 6 is in "low." Connected to brake pedal 8 is one end of a cable 32 which extends forward around a pulley 31 and thence up over drum 16 so that an upward movement of lever 26 will wind up the cable and apply the service brake, the other end of cable 32 being connected to the drum. Connected to reversing pedal 7 is one end of a cable 33 which extends forward around a pulley 31 and thence up under drum 16, the other end being fastened to the drum so that when lever 26 is pushed down the reverse pedal will be operated. The ends of the cables may be fastened to the drums in any suitable manner, but preferably I construct the drum and fasten the cables thereto as shown in Fig. 4.

Referring particularly to Fig. 4, the drum comprises a cylindrical member 34 having a fixed head 35 and a removable head 36, the latter being fastened in place by screws 37 and two pins 38. In cylindrical member 34 is a slot 39 adapted to receive the cable and on the end of the cable is fixed a ball 40 of such diameter that it will not pass thru slot 39. To fasten the end of the cable to the drum, head 36 is removed, after which the end of the cable is passed sidewise into slot 39 with ball 40 inside the member 34. Head 36 is then replaced. The end of the cable is thus firmly fixed to the drum. At the same time, however, it can be easily detached, which makes renewal of the cable an easy matter.

In any or all of the cables I may provide turn buckles whereby the cables may be shortened to compensate for wear, and in the present instance I have shown turn buckles 41 in cables 30 and 33 for this purpose.

It is desirable to be able to operate levers 24 and 26, simultaneously and with one hand when it is desired to stop the automobile and to enable this to be done I provide projections 42 or levers 24 and 26, which projections extend toward each other so that the driver by grasping the two projections and pulling up can move levers 24 and 26 at the same time to bring clutch pedal 6 to neutral position and apply the brake.

The operation is as follows:—The emergency brake being on, the driver starts his engine and if it has not already been done, he then puts lever 24 in neutral notch 21 thus winding cable 30 around drum 15 and pulling pedal 6 to neutral position. Lever 26 stands in notch 23 so the brake pedal 8 and reversing pedal 7 are in normal "off" positions. Lever 9 is now pushed forward to release the emergency brake and put the clutch mechanism in condition so that when pedal 6 is pushed down the automobile will be in "low," and following this lever 24 is pulled up to notch 22 thus pulling pedal 6 entirely down and putting the automobile in "low." After the automobile is started in low, lever 24 is moved to notch 20 thus releasing pedal 6, which moves to "up" position and puts the automobile in "high." The driver can apply the brake at will by means of lever 26 by pulling up on it to wind cable 32 on drum 16, which pulls pedal 7 down, cable 33 which connects to the reverse pedal 8 being unwound.

When running in "high" and it is desired to slow down or stop the driver can grasp projections 42 and simultaneously pull up both levers 24 and 26. He pulls the lever 24 until catch 25 snaps into neutral notch 21, which brings pedal 6 to neutral position after which he lets go of the projection 42 on lever 24. He can then continue to apply the brake by means of lever 26 as found desirable. This is a most advantageous feature of my invention and one which has been found very desirable in actual use. When running in "high" the driver can quickly go into "low" by pulling up on lever 24 to bring latch 25 to notch 22.

To reverse the automobile, lever 24 is put in neutral notch 21 which brings pedal 6 to neutral position after which lever 26 is pushed down thus winding cable 33 around drum 16 and pulling pedal 7 down. During this movement cable 32 is unwound off the drum. By pulling up on lever 26 the automobile can be quickly thrown out of reverse and the brake applied.

By the use of drums around which the operating cables are wound I obtain a good leverage action so levers 24 and 26 can be easily operated and I am also by this arrangement enabled to operate two pedals from a single lever. This is of importance in the case of an automobile having three foot pedals such as are found, for example, on a Ford automobile. Also by providing three notches corresponding to the three definite positions of the clutch pedal the driver has no difficulty in bringing the pedal to the correct position. This is particularly useful in bringing the clutch pedal to "neutral."

The operating mechanism is comparatively simple in structure, can be quickly applied to an automobile without modifying the automobile in any way or destroying any of its parts, and can be easily adjusted to correct position without the services of a skilled mechanic. Also in any particular instance either of the drums 15 or 16 may be omitted in case the driver has the use of one limb.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with an automobile having a clutch pedal which has at least three definite positions corresponding to definite operating conditions of the automobile and a brake pedal, of a yoke clamped to the steering post, two drums carried by said yoke, operating levers for said drums, latches for said levers, cables connecting said pedals to the drums, and fixed members having notches with which said latches engage, the fixed member which cooperates with the clutch pedal lever having a single notch for each pedal position, said levers having parts which project into proximity to each other whereby both may be operated simultaneously with one hand.

2. The combination with an automobile having a clutch pedal which has a plurality of operating positions, a brake pedal, and a reversing pedal, of two drums carried by the steering post, operating levers for said drums, a cable connecting the clutch pedal to one of said drums, cables connecting the brake pedal and the reversing pedal to the other of said drums, latches for said levers, and fixed members having notches with which said latches engage.

In witness whereof, I have hereunto set my hand this 27th day of July, 1921.

LEWIS J. QUAY.